(No Model.)
C. FELDER.
COMB.
No. 424,604. Patented Apr. 1, 1890.
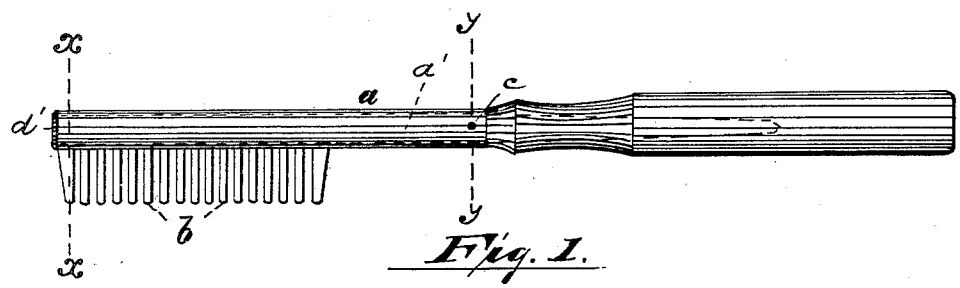
Fig. 1.
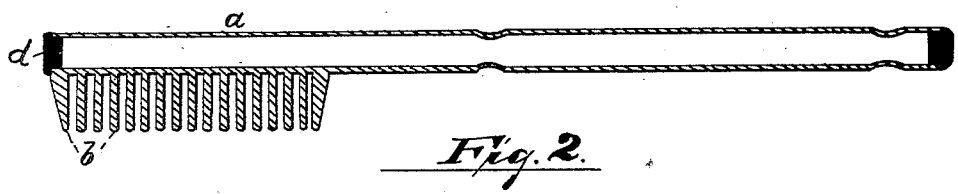
Fig. 2.
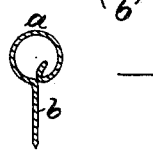
Fig. 2a.
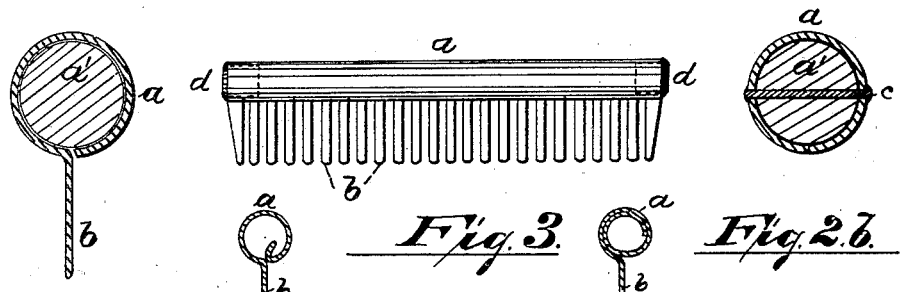
Fig. 3.
Fig. 5.
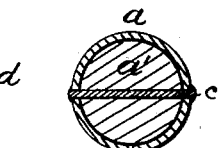
Fig. 2b.
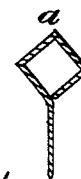
Fig. 6.
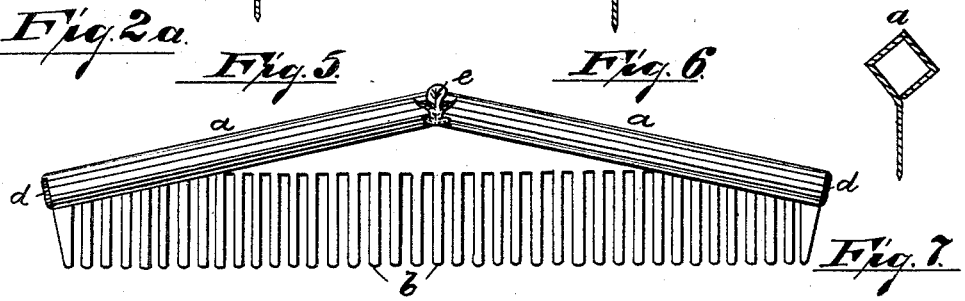
Fig. 7.
Fig. 4.
WITNESSES:
Alfred Gartner
E. L. Sherman
INVENTOR
Charles Felder
BY Draker Co, ATTY'S.

UNITED STATES PATENT OFFICE.

CHARLES FELDER, OF NEWARK, NEW JERSEY.

COMB.

SPECIFICATION forming part of Letters Patent No. 424,604, dated April 1, 1890.

Application filed May 17, 1889. Serial No. 311,168. (No model.)

*To all whom it may concern:*

Be it known that I, CHARLES FELDER, a citizen of the United States, residing at Newark, in the county of Essex and State of New Jersey, have invented certain new and useful Improvements in Metal Combs; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide a light, strong, and sightly comb at a comparatively small cost.

In the accompanying drawings, Figures 1, 2, 3, and 4 represent in elevation combs embodying my improvements. Fig. 2$^a$ is a section through line $x$, and Fig. 2$^b$ a section through line $y$ of Fig. 1. Figs. 5, 6, and 7 represent detail views.

Similar letters of reference indicate like parts wherever they occur.

The chief feature of novelty consists in making the entire comb of one piece of sheet metal and bending or forming the back $a$ into a tube or other curved form, as indicated in Figs. 5, 6, and 7, and forming the teeth $b$ by sawing, milling, or punching, as will be understood by reference to the several figures of the drawings, especial reference being had to Fig. 2$^a$. The ends of the tube or back $a$ may be filled by a suitable plug $d$, and when a wooden handle is provided, as indicated in Fig. 1, I insert through the tube $a$ a metal shank $a'$, which passes entirely through the tube and into the handle, as indicated by dotted lines in said Fig. 1, said shank being secured in position by means of a rivet $c$, as shown in Fig. 2$^b$, or in any other convenient manner, thus making the comb very strong and durable. In forming the tube or back in a comb that is tapering from the center to the ends, as in Fig. 4, there may be a joint or split in the metal at the center, which may be hidden or covered by a neat ornament $e$, fastened thereat by soldering or other suitable means, as will be understood.

It will be observed that Figs. 1 and 2 represent an ordinary curling-comb, one with a wooden handle and the other having the handle formed by a prolongation of the tube or back to a suitable length, thus forming both comb and handle from one piece of metal. Fig. 3 represents a pocket-comb, and Fig. 4 a toilet-comb.

Having thus described my invention, what I claim as new is—

1. A comb composed of one piece of sheet metal with the handle and back formed into a tube, as and for the purpose set forth.

2. A comb composed of one piece of sheet metal having the back formed into a curved shape, and a handle immovably secured to said comb, as described, for the purpose set forth.

3. A comb composed of one piece of sheet metal and having the back formed as described, and having its ends filled with a suitable plug, as and for the purpose set forth.

4. A comb composed of one piece of sheet metal and having the back formed as described, and a shank passing therethrough and into the handle, as and for the purpose set forth.

In testimony that I claim the foregoing I have hereunto set my hand this 6th day of May, 1889.

CHARLES FELDER.

Witnesses:
OLIVER DRAKE,
E. L. SHERMAN.